(12) United States Patent
Tago et al.

(10) Patent No.: US 8,549,227 B2
(45) Date of Patent: Oct. 1, 2013

(54) MULTIPROCESSOR SYSTEM AND OPERATING METHOD OF MULTIPROCESSOR SYSTEM

(75) Inventors: Shinichiro Tago, Kawasaki (JP); Atsuhiro Suga, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 432 days.

(21) Appl. No.: 12/199,240

(22) Filed: Aug. 27, 2008

(65) Prior Publication Data

US 2008/0313404 A1   Dec. 18, 2008

Related U.S. Application Data

(63) Continuation of application No. PCT/JP2006/304146, filed on Mar. 3, 2006.

(51) Int. Cl.
*G06F 13/00* (2006.01)
(52) U.S. Cl.
USPC ............................. 711/122; 711/133; 711/151
(58) Field of Classification Search
USPC ................. 711/100, 117–122, 130, 133, 137, 711/19, 151, 154, 159–160
See application file for complete search history.

(56) References Cited

U.S. PATENT DOCUMENTS

| | | | | |
|---|---|---|---|---|
| 4,719,568 A | * | 1/1988 | Carrubba et al. | 711/123 |
| 6,564,302 B1 | * | 5/2003 | Yagi et al. | 711/144 |
| 6,640,286 B2 | * | 10/2003 | Kawamoto et al. | 711/133 |
| 6,691,080 B1 | * | 2/2004 | Tachibana | 703/19 |
| 6,757,726 B2 | * | 6/2004 | Matsumoto et al. | 709/223 |
| 6,950,904 B2 | * | 9/2005 | Erdner et al. | 711/136 |
| 7,210,021 B2 | * | 4/2007 | Sato et al. | 711/220 |
| 7,386,687 B2 | * | 6/2008 | Inoue et al. | 711/147 |
| 7,836,260 B2 | * | 11/2010 | Gara et al. | 711/137 |

* cited by examiner

*Primary Examiner* — Tuan Thai
*Assistant Examiner* — Zhuo Li
(74) *Attorney, Agent, or Firm* — Arent Fox LLP

(57) ABSTRACT

According to one aspect of embodiments, a multiprocessor system includes a cache memory corresponding to each of the processors, a hierarchy setting register in which the hierarchical level of each cache memory is set, an access control unit that controls access between each cache memory. The hierarchical level of the cache memory for each processor is stored in a rewritable hierarchy setting register. Each processor handles a cache memory corresponding to another processor as the cache memory having a deeper hierarchy than the cache memory corresponding to the each processor. As the result, each processor can access all the cache memories, and therefore the efficiency of cache memory utilization can be improved and the hierarchical level can be set so that the latency becomes optimal for each application.

18 Claims, 6 Drawing Sheets

| | C0 | C1A | C1B | C2 |
|---|---|---|---|---|
| P0 | LEVEL 1 | UNUSED | LEVEL 3 | LEVEL 2 |
| P1 | UNUSED | LEVEL 1 | UNUSED | UNUSED |
| P2 | UNUSED | UNUSED | UNUSED | LEVEL 1 |
| P3 | UNUSED | UNUSED | LEVEL 1 | UNUSED |

| | C0 | C1 | C2 | C3 |
|---|---|---|---|---|
| P0 | LEVEL 1 | LEVEL 2 | LEVEL 2 | LEVEL 3 |
| P1 | LEVEL 2 | LEVEL 1 | LEVEL 2 | LEVEL 3 |
| P2 | LEVEL 2 | LEVEL 2 | LEVEL 1 | LEVEL 3 |

|    | LRU LATEST | OTHER THAN LRU LATEST |
|----|------------|----------------------|
| C0 | KEEP       | MOVE                 |
| C1 | KEEP       | MOVE                 |
| C2 | KEEP       | MOVE                 |
| C3 | COPY       | COPY                 |

Fig. 3

| C0 | DISCARD |
|----|---------|
| C1 | MOVE    |
| C2 | MOVE    |
| C3 | DISCARD |

Fig. 4

|    | CACHE HIT | | REPLACEMENT |
|----|-----------|-----------|-------------|
|    | LRU LATEST | OTHER THAN LRU LATEST | |
| C0 | SECOND | LATEST | OLDEST |
| C1 | SECOND | LATEST | OLDEST |
| C2 | SECOND | LATEST | OLDEST |
| C3 | LATEST | LATEST | KEEP |

| | C0 | C1A | C1B | C2 |
|---|---|---|---|---|
| P0 | LEVEL 1 | UNUSED | LEVEL 2 | LEVEL 3 |
| P1 | UNUSED | LEVEL 1 | UNUSED | UNUSED |
| P2 | UNUSED | UNUSED | UNUSED | LEVEL 1 |
| P3 | UNUSED | UNUSED | UNUSED | LEVEL 1 |

|    | C0      | C1A     | C1B     | C2      |
|----|---------|---------|---------|---------|
| P0 | LEVEL 1 | UNUSED  | LEVEL 3 | LEVEL 2 |
| P1 | UNUSED  | LEVEL 1 | UNUSED  | UNUSED  |
| P2 | UNUSED  | UNUSED  | UNUSED  | LEVEL 1 |
| P3 | UNUSED  | UNUSED  | LEVEL 1 | UNUSED  |

Fig. 9

| C0  | —    |
|-----|------|
| C1A | —    |
| C1B | MOVE |
| C2  | COPY |

Fig. 10

| C0  | MOVE        |
| C1A | DISCARD     |
| C1B | WRITE TO MM |
| C2  | DISCARD     |

ISSUE WRITE REQUEST FOR ADDRESS X BY PROCESSOR P2 — S200

ISSUE READ REQUEST FOR ADDRESS X BY PROCESSOR P0 — S210

ISSUE READ REQUEST FOR ADDRESS Y BY PROCESSOR P3 — S220

US 8,549,227 B2

MULTIPROCESSOR SYSTEM AND OPERATING METHOD OF MULTIPROCESSOR SYSTEM

CROSS-REFERENCE TO RELATED APPLICATION

This application is a Continuation Application of International Application No. PCT/JP2006/304146, filed Mar. 3, 2006, designating the U.S., the entire contents of which are incorporated herein by reference.

BACKGROUND

1. Field

The present embodiments relate to a multiprocessor system and a method of operating the multiprocessor system.

2. Description of the Related Art

Generally, in a processor system, a method is employed in which a high-speed cache memory is installed between a processor and a main memory, i.e., a main memory unit, in order to balance the operating speeds between the processor and the main memory. Moreover, in a system requiring high processing capabilities, a multiprocessor system using a plurality of processors is used. In the multiprocessor system, for example, a cache memory installed in the multiprocessor system, in which a plurality of processors accesses data of a main memory via the cache memory, is provided corresponding to each of the processors. This cache memory is accessed from all the processors with a fixed access priority given for each processor (e.g., Japanese Unexamined Patent Application Publication No. H6-202949).

In a conventional multiprocessor system with a cache memory corresponding to each processor, each cache memory is accessed from all the processors, so that the efficiency of cache memory utilization is excellent. However, since the access priority (hierarchical level) to each cache memory is fixed, a delay time (latency) after the processor requests access to the cache memory until it receives data may be increased. For example, even when the hierarchical level for achieving the optimal latency differs for each application to be used, the hierarchical level of the cache memory is fixed. For this reason, the latency may increase depending on the application. Moreover, when the shared data accessed by a plurality of processors is present in any one of the cache memories, the transfer of the data to other cache memories might reduce the latency further. Even in this case, the data cannot be transferred between the cache memories, so that the latency will not be reduced.

SUMMARY

According to one aspect of embodiments, a multiprocessor system is provided which includes a multiprocessor system, including a plurality of processors, a plurality of cache memories having a different hierarchical level for each processor and being shared by the processors, a rewritable hierarchy setting register storing a hierarchical level of the cache memory, and an access control unit controlling access between each cache memory in accordance with the hierarchical level set in the hierarchy setting register.

BRIEF DESCRIPTION OF THE DRAWINGS

FIG. 3 illustrates a transfer condition of a cache line at which a cache hit was generated in a lower hierarchy, the transfer condition being set in a transfer setting register shown in FIG. 1.

FIG. 4 illustrates a replacement condition of a cache line at the time of cache line registration, the replacement condition being set in a replacement setting register shown in FIG. 1.

FIG. 9 illustrates another example of the hierarchical levels of the cache memory when viewed from each processor, the hierarchical levels being set in the hierarchy setting register shown in FIG. 7.

FIG. 10 illustrates a transfer condition of a cache line at which a cache hit was generated in a lower hierarchy, the transfer condition being set in a transfer setting register shown in FIG. 7.

DETAILED DESCRIPTION OF THE EMBODIMENTS

Hereinafter, the present embodiments will be described using the accompanying drawings.

Figures 1, 2:
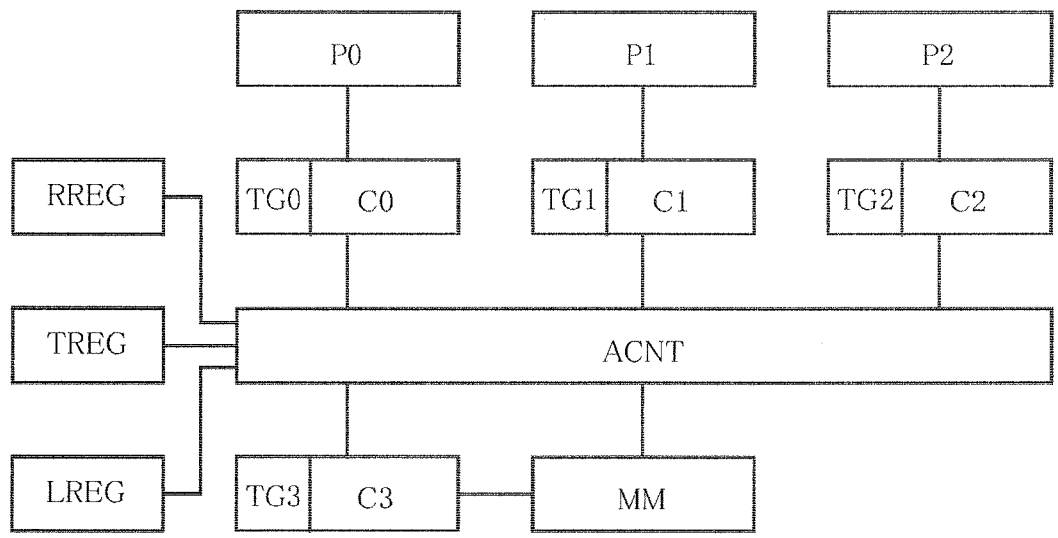
FIG. 1 illustrates an embodiment.
FIG. 2 illustrates hierarchical levels of cache memories when viewed from each processor, the hierarchical levels being set in a hierarchy setting register shown in FIG. 1.

FIG. 1 shows one embodiment. A multiprocessor system includes processors P0, P1, and P2, cache memories C0, C1, C2, and C3, an access control unit ACNT, a hierarchy setting register LREG, a transfer setting register TREG, a replacement setting register RREG, and a main memory MM. Each of the cache memories C0-C3 has each of tags TG0-TG3, respectively. The processors P0, P1, and P2 are directly coupled to the cache memories C0, C1, and C2, respectively. The cache memories C0, C1, and C2 are coupled to the access control unit ACNT. The access control unit ACNT is coupled to the hierarchy setting register LREG, the transfer setting register TREG, the replacement setting register RREG, the cache memory C3, and the main memory MM. The main memory MM is coupled to the cache memory C3. LRU (Least Recently Used) data is recorded in each of tags TG0-TG3 of each of the cache memories C0-C3. Here, the LRU data is data for selecting a cache line having the longest unused time. The registers LREG, TREG, and RREG described above are rewritable. By rewriting to a setting appropriate for each application, it is always possible to reduce the latency without depending on the application.

FIG. 2 shows a hierarchical level of each of the cache memories C0-C3 when viewed from the processors P0-P2. The hierarchical levels of the cache memories C0-C3 shown in FIG. 2 are set in the hierarchy setting register LREG shown in FIG. 1. The access control unit ACNT controls access between each of the cache memories C0-C3 in accordance with the hierarchical level set in the hierarchy setting register LREG. The hierarchical levels of the cache memories C0, C1, C2, and C3 when viewed from the processor P0 are level 1, level 2, level 2, and level 3, respectively. The hierarchical levels of the cache memories C0, C1, C2, and C3 when viewed from the processor P1 are level 2, level 1, level 2, and level 3, respectively. The hierarchical levels of the cache memories C0, C1, C2, and C3 when viewed from the processor P2 are level 2, level 2, level 1, and level 3, respectively. Since the processors P0-P2 can access all the cache memories C0-C3, the efficiency of cache memory utilization can be improved. Moreover, the processors P0-P2 are provided with the cache memories of level 2 and level 3. Thereby, the chances to access the main memory MM can be reduced and the latency can be reduced.

FIG. 3 shows transfer conditions (conditions for determining whether to move, copy, or keep) of a cache line at which a cache hit was generated in the cache memory of a lower hierarchy. The transfer conditions shown in FIG. 3 are set in the transfer setting register TREG shown in FIG. 1. In accordance with the conditions set in the transfer setting register TREG, the access control unit ACNT controls a cache line at which a cache hit was generated in the cache memory of a lower hierarchy. When the value of the LRU data indicates the last-used data (latest data), the cache memories C0-C2 keep the cache line without moving it When the value of the LRU data indicates other than the latest data, the cache memories C0-C2 move the cache line (do not copy this). When other processors continue to use the cache line, the cache line is moved in accordance with the transfer conditions shown in FIG. 3 and the cache line is registered with an appropriate cache memory. As a result, the latency can be reduced. The cache memory C3 copies the cache line regardless of the value of the LRU data.

FIG. 4 shows the conditions (hereafter, also referred to as replacement conditions) for determining whether to move a cache line, which overflowed from a cache memory of a higher hierarchy when the cache line was registered, to other cache memories, to write the same to the main memory MM, or to discard the same. The replacement conditions shown in FIG. 4 are set in the replacement setting register RREG shown in FIG. 1. In accordance with the conditions set in the replacement setting register RREG, the access control unit ACNT controls the cache line that overflowed from the cache memory of the higher hierarchy. The replacement conditions of the cache memories C0, C1, C2, and C3 are "discard", "move", "move", and "discard", respectively. Since the replacement condition of a cache line can be set for each cache memory in this manner, the latency can be reduced by rewriting to a setting appropriate for each application. For example, under the replacement conditions of FIG. 4, when a certain processor accesses a cache line that overflowed from the cache memories C1, C2, this cache line is currently registered with other cache memories, and therefore the processor does not need to access to the main memory MM. As a result, the latency can be reduced.

Figures 5, 6:
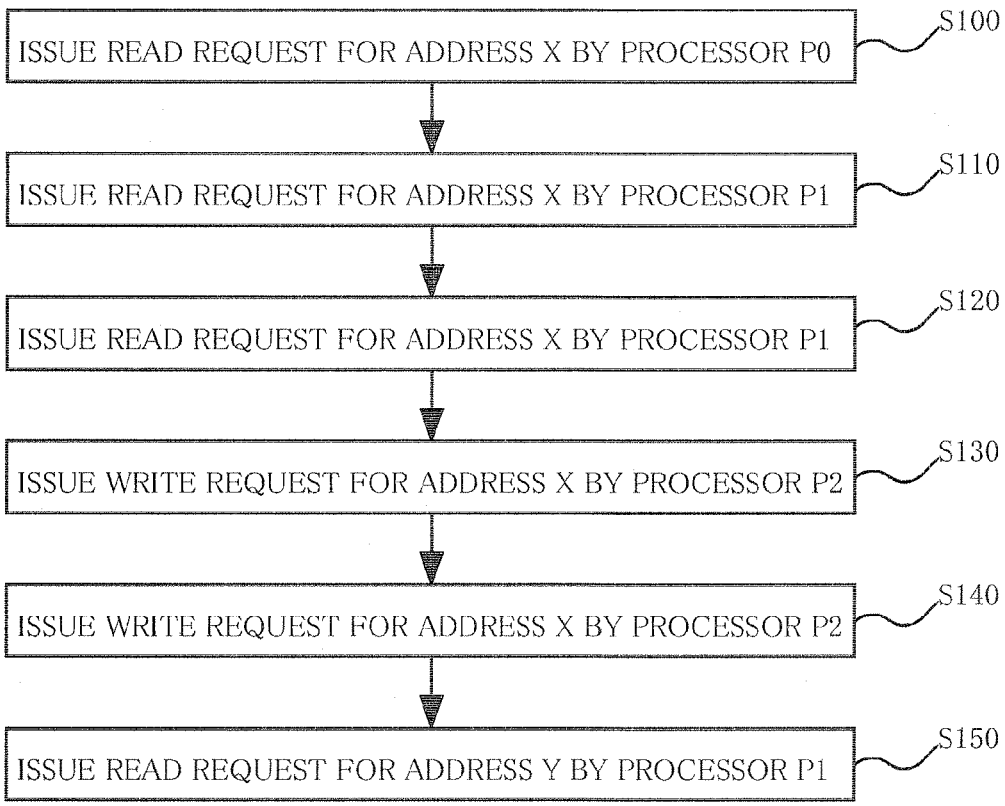
FIG. 5 illustrates an update procedure of LRU data set in the transfer setting register shown in FIG. 1.
FIG. 6 illustrates an example of the operation of a multiprocessor system of FIG. 1.

FIG. 5 shows an update procedure of the LRU data. The update procedure of the LRU data shown in FIG. 5 is set in the transfer setting register TREG shown in FIG. 1. Hereinafter, the update procedure of the LRU data when a cache hit was generated in a cache memory of a lower hierarchy is described as an example. When the value of the LRU data corresponding to a cache line at which a cache hit was generated is the "latest", the cache memories C0, C1, and C2 replace the value of the LRU data with the "second" from the "latest" (column of "LRU latest" shown in FIG. 5). As a result, the value of the LRU data corresponding to the second recently used cache line is set to the "latest", and the value of the LRU data corresponding to the most recently used cache line is set to the "second". In the conventional update procedure, the value of the LRU data corresponding to the second recently used cache line is set to the "second". When the value of the LRU data corresponding to a cache line at which a cache hit was generated is not the "latest", the cache line is moved to the cache memory of level 1 and thereafter the value of the LRU data is set to the "latest" (column of "other than LRU latest" shown in FIG. 5). The cache memory C3 sets the value of the LRU data to the "latest" regardless of the value of the LRU data. In this embodiment, the LRU data is updated so that the transfer conditions shown in FIG. 4 may work.

Moreover, when the replacement of a cache line occurs and a cache line that overflowed from a higher hierarchy is registered with the cache memory of a lower hierarchy, the cache memories C0-C2 set to the "oldest" the value of the LRU data to which the cache line is to be assigned (column of "replacement" of FIG. 5). The cache memory C3 will not change the value of the LRU data to which the cache line is to be assigned (column of "replacement" of FIG. 5). Here, the "oldest" of the value of the LRU data implies the first-used cache line (a cache line having the longest unused time).

FIG. 6 shows an example of the operation of the multiprocessor system of FIG. 1. The addresses X, Y indicate addresses in the main memory MM of FIG. 1. The operation shown in FIG. 6 will be described with a case where the data of the address X is not registered yet with the cache memories C0-C3 and the data of the address Y is already registered with the cache memory C3, as an example.

First, in operation S100, the processor P0 issues a read request for the address X to the cache memory C0 (level 1). The cache memory C0 results in a cache miss. The cache memory C0 notifies the access control unit ACNT of the cache miss. The access control unit ACNT issues a read request for the address X to the cache memory C1 (level 2) and the cache memory C2 (level 2) in accordance with the hierarchy set in the hierarchy setting register LREG. The cache memories C1, C2 result in a cache miss. The cache memories C1, C2 notify the access control unit ACNT of the cache miss. The access control unit ACNT issues a read request for the address X to the cache memory C3 (level 3). The cache memory C3 results in a cache miss. The cache memory C3 notifies the access control unit ACNT of the cache miss.

Since the cache memory having a lower hierarchy than the cache memory C3 is currently not set in the hierarchy setting register LREG, the access control unit ACNT issues a read request for the address X to the main memory MM. The access control unit ACNT reads from the main memory MM a cache-line size of data including the address X. The access control unit ACNT transfers the cache line including the read data to the cache memories C0, C3. The cache memory C3 is used as a shared cache memory of the lowermost layer in the processors P0-P2. For this reason, the cache line read from the main memory MM is also registered with the cache memory C3. The cache memories C0, C3 check the value of the LRU data to which the cache line sent from the access control unit ACNT is to be assigned. The cache memories C0, C3 drive out a cache line having the "oldest" value of the LRU data and register the sent cache line. The cache memory C0 returns the data of the address X to the processor P0.

Since the replacement condition of the replacement setting register RREG of the cache memories C0, C3 is "discard", the access control unit ACNT discards a cache line overflowed from the cache memories C0, C3. However, when the cache line overflowed from the cache memory C0 is "dirty", the access control unit ACNT moves the cache line overflowed from the cache memory C0 to the cache memory C3. Here, the "dirty" indicates a state where only data present in a cache memory of a higher hierarchy is updated but the data present in a cache memory of a lower hierarchy or in the main memory MM is not yet updated. The cache memory C3 checks the value of the LRU data to which a cache line sent from the cache memory C0 is to be assigned. The cache memory C3 drives out a cache line having the "oldest" value of the LRU data and registers a cache line sent from the cache memory C0. The cache memory C3 sets the registered cache line to "dirty". When a cache line overflowed from the cache memory C3 is "dirty", the access control unit ACNT writes this cache line to the main memory MM.

In operation S110, the processor P1 issues a read request for the address X to the cache memory C1 (level 1). The cache memory C1 results in a cache miss. The cache memory C1 notifies the access control unit ACNT of the cache miss. The access control unit ACNT issues a read request for the address X to the cache memories C0, C2 (level 2). The cache memory C0 results in a cache hit. The cache memory C0 notifies the access control unit ACNT of the cache hit. The access control unit ACNT checks the value of the LRU data of a cache line at which a cache hit was generated, and the transfer condition of the transfer setting register TREG. Since the value of the LRU data indicates the "latest", the access control unit ACNT keeps the cache line at which the cache hit was generated without moving it. The access control unit ACNT returns the data of the address X to the processor P1 from the cache memory C0 via the cache memory C1. The cache memory C0 sets the value of the LRU data of the cache line at which the cache hit was generated to the "second". For example, if the processor P0 issues a read request for the address X again before operation S120, the data of the address X is still registered with the cache memory C0 (level 1), and therefore the latency can be reduced.

In operation S120, the processor P1 issues again a read request for the address X to the cache memory C1 (level 1). The cache memory C1 results in a cache miss. The cache memory C1 notifies the access control unit ACNT of the cache miss. The access control unit ACNT issues a read request for the address X to the cache memories C0, C2 (level 2). The cache memory C0 results in a cache hit. The cache memory C0 notifies the access control unit ACNT of the cache hit. The access control unit ACNT checks the value of the LRU data of a cache line at which the cache hit was generated, and the transfer condition of the transfer setting register TREG. Since the value of the LRU data indicates the "second", the access control unit ACNT moves the cache line at which the cache hit was generated to the cache memory C1 (level 1). The cache memory C1 checks the value of the LRU data to which the cache line sent from the cache memory C0 is to be assigned. The cache memory C1 drives out a cache line having the "oldest" value of the LRU data and registers the sent cache line. The cache memory C1 sets the value of the LRU data of the registered cache line to the "latest". Furthermore, the cache memory C1 returns the data of the address X to the processor P1.

Moreover, since the replacement condition of the cache memory C1 of the replacement setting register RREG is currently set to "move", the access control unit ACNT moves a cache line overflowed from the cache memory C1 to the cache memory C0. The cache memory C0 registers a cache line overflowed from the cache memory C1 to a location where the cache line (cache line at which the cache hit was generated) that has been sent to the cache memory C1 was present. The cache memory C0 sets the value of the LRU data of the registered cache line to the "oldest". Since a cache line at which the cache hit was generated in the cache memory C0 of a lower hierarchy is moved to the cache memory C1 in this manner, the same data will not be present in the cache memory C0 and in the cache memory C1. For this reason, the efficiency of cache memory utilization can be improved. Moreover, a cache line overflowed from the cache memory C1 of a higher hierarchy is moved to the cache memory C0 of a lower hierarchy without being returned to the main memory MM. Accordingly, when a certain processor issues an access request to an address corresponding to this cache line, the cache line is still registered with the cache memory C0, and therefore the latency can be reduced.

In operation S130, the processor P2 issues a write request for the address X to the cache memory C2 (level 1). The cache memory C2 results in a cache miss. The cache memory C2 notifies the access control unit ACNT of the cache miss. The access control unit ACNT issues a write request for the address X to the cache memories C0, C1 (level 2). The cache memory C1 results in a cache hit. The cache memory C1 notifies the access control unit ACNT of the cache hit. The access control unit ACNT checks the value of the LRU data of a cache line at which the cache hit was generated, and the transfer condition of the transfer setting register TREG. Since the value of the LRU data indicates the "latest", the access control unit ACNT keeps the cache line at which the cache hit was generated without moving it. The access control unit ACNT sends to the cache memory C1 the data sent from the processor P2. The cache memory C1 writes to the cache line at which the cache hit was generated the data sent from the processor P2 via the access control unit ACNT, and sets the value of the LRU data to the "second". The cache memory C1 sets the updated cache line to "dirty". Alternatively, the cache memory C1 writes through to the cache memory C3 of a lower hierarchy or through to the main memory MM without setting the updated cache line to "dirty". Here, the write-through is a method in which when a processor writes data to a cache memory of a higher hierarchy, the data is written to a cache memory of a higher hierarchy and at the same time also to a memory of a lower hierarchy.

In operation S130, the processor P2 writes data directly to the cache memory C1. For this reason, when the processor P1 issues an access request for the address X before operation S140, the data of the address X is still registered with the cache memory C1 (level 1), and therefore the latency can be reduced.

In operation S140, the processor P2 issues again a write request for the address X to the cache memory C2 (level 1). The cache memory C2 results in a cache miss. The cache memory C2 notifies the access control unit ACNT of the cache miss. The access control unit ACNT issues a write request for the address X to the cache memories C0, C1 (level 2). The cache memory C1 results in a cache hit. The cache memory C1 notifies the access control unit ACNT of the cache hit. The access control unit ACNT checks the value of the LRU data of a cache line at which the cache hit was generated, and the transfer condition of the transfer setting register TREG. Since the value of the LRU data indicates the "second", the access control unit ACNT moves a cache line at which the cache hit was generated to the cache memory C2 of the uppermost hierarchy. The cache memory C2 checks the value of the LRU data to which the cache line sent from the cache memory C1 is to be assigned. The cache memory C2 drives out a cache line having the "oldest" value of the LRU data and registers the sent cache line. The cache memory C2 writes to the registered cache line the data sent from the processor P2. The cache memory C2 sets the written cache line to "dirty" and sets the value of the LRU data to the "latest". Accordingly, when the processor P2 issues again an access request for the address X, the data of the address X is still registered with the cache memory C2 (level 1), and therefore the latency can be reduced.

Since the replacement condition of the cache memory C2 of the replacement setting register RREG is currently set to "move", the access control unit ACNT moves a cache line overflowed from the cache memory C2 to the cache memory C1. The cache memory C1 registers the cache line overflowed from the cache memory C2 to a location where the cache line sent to the cache memory C2 was present, and changes the value of the LRU data to the "oldest". Also in this case, as in operation S120, a cache line overflowed from the cache memory C2 of a higher hierarchy is moved to the cache memory C1 of a lower hierarchy without being returned to the main memory MM. Accordingly, when a certain processor issues an access request to an address corresponding to this cache line, the cache line is still registered with the cache memory C1, and therefore the latency can be reduced.

In operation S150, the processor P1 issues a read request for the address Y to the cache memory C1 (level 1). The cache memory C1 results in a cache miss. The cache memory C1 notifies the access control unit ACNT of the cache miss. The access control unit ACNT issues a read request for the address Y to the cache memories C0, C2 (level 2). The cache memories C0, C2 result in a cache miss. The cache memories C0, C2 notify the access control unit ACNT of the cache miss. The access control unit ACNT issues a read request for the address Y to the cache memory C3 (level 3). The cache memory C3 results in a cache hit. The cache memory C3 notifies the access control unit ACNT of the cache hit. Since the transfer condition of the cache memory C3 of the transfer setting register TREG is currently set to "copy", the access control unit ACNT copies a cache line at which the cache hit was generated to the cache memory C1 of the uppermost hierarchy. The cache memory C1 checks the value of the LRU data to which a cache line sent from the cache memory C3 is to be assigned. The cache memory C1 drives out a cache line having the "oldest" value of the LRU data and registers the sent cache line. The cache memory C1 sets the value of the LRU data to the "latest". Furthermore, the cache memory C1 returns the data of the address Y to the processor P1. Moreover, since the replacement condition of the cache memory C1 of the replacement setting register RREG is currently set to "move", the access control unit ACNT moves a cache line overflowed from the cache memory C1 to the cache memory C0 of one level lower. As shown in FIG. 2, when there is a plurality of cache memories of one level lower, a cache memory to serve as the destination of the cache line is selected based on a certain criterion. In operation S150, the cache memory to serve as the destination of the cache line is randomly selected from the cache memory C0 and the cache memory C2. As a result, the cache memory C0 is selected.

The cache memory C0 checks the value of the LRU data to which the cache line sent from the cache memory C1 is to be assigned. The cache memory C0 drives out a cache line having the "oldest" value of the LRU data and registers the sent cache line. The cache memory C0 sets the value of the LRU data to the "oldest". Since the replacement condition of the cache memory C0 of the replacement setting register RREG is currently set to "discard", the access control unit ACNT discards the cache line overflowed from the cache memory C0. When the replacement condition is set to "discard", a move of the cache line to the lower hierarchy cache memory will not occur, and therefore the bus occupancy ratio can be reduced. However, when the cache line to be discarded is "dirty", the access control unit ACNT moves the cache line to be discarded to the cache memory C3. The cache memory C3 checks the value of the LRU data to which a cache line sent from the cache memory C0 is to be assigned. The cache memory C3 drives out a cache line having the "oldest" value of the LRU data and registers the sent cache line. The cache memory C3 sets the registered cache line to "dirty". Since the replacement condition of the cache memory C3 of the replacement setting register RREG is currently set to "discard", the access control unit ACNT discards the cache line overflowed from the cache memory C3. At this time, when the cache line to be discarded is "dirty", the access control unit ACNT writes the cache line to be discarded to the main memory MM.

As described above, in this embodiment, since the processors P0-P2 can access all the cache memories C0-C3 in accordance with the hierarchical levels set in the hierarchy setting register LREG, the efficiency of cache memory utilization can be improved. Furthermore, since the condition set in the registers LREG, TREG, and RREG can be set to an appropriate condition for each application, it is always possible to reduce the latency without depending on the application. As a result, the latency can be reduced while maintaining a high efficiency of cache memory utilization.

Figures 7, 8:
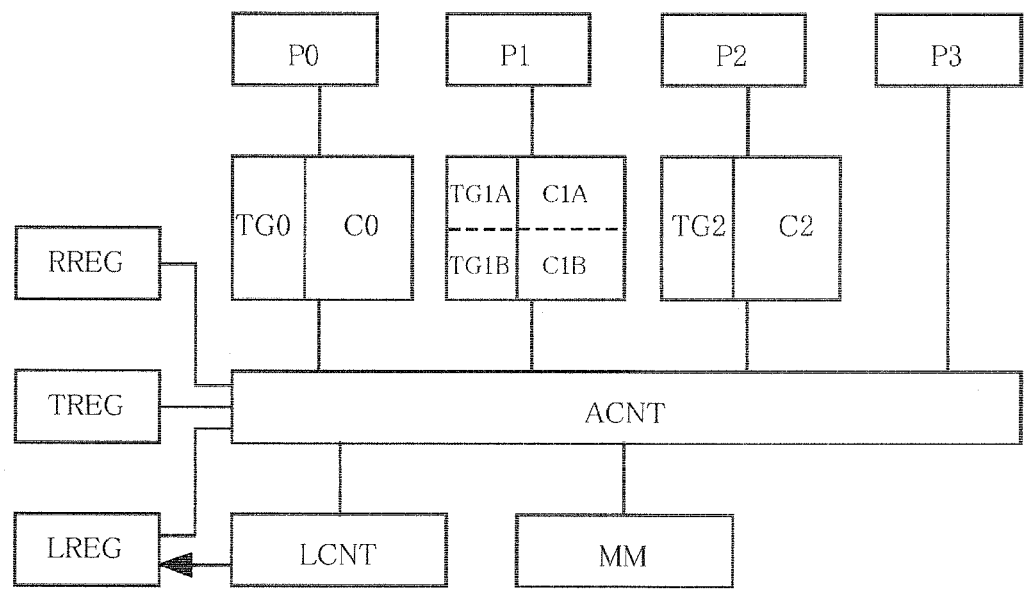
FIG. 7 illustrates another embodiment.
FIG. 8 illustrates an example of the hierarchical levels of a cache memory when viewed from each processor, the hierarchical levels being set the in a hierarchy setting register shown in FIG. 7.

FIG. 7 shows another embodiment. The same element as the element described in FIG. 1 to FIG. 6 is given the same symbol, and the detailed description thereof is omitted. In the multiprocessor system of this embodiment, the cache memory C3 of the embodiment described in FIG. 1 to FIG. 6 is omitted, and a processor P3 and a hierarchy setting unit LCNT are added. Moreover, the cache memory C1 is divided into a cache memory C1A and a cache memory C1B, assuming that the cache memory capacity may be small judging from the characteristics of the application of the processor P1. The cache memory C1B is opened to other processors.

The processor P3 is directly coupled to the access control unit ACNT. The hierarchy setting unit LCNT is coupled to the access control unit ACNT and the hierarchy setting register LREG. The hierarchy setting unit LCNT sets hierarchical levels to the hierarchy setting register LREG. In this embodiment, for an access request of the processor P0, the hierarchy setting unit LCNT sets hierarchical levels of FIG. 9 to the hierarchy setting register LREG when a cache hit is generated in the cache memory C2, and the hierarchy setting unit LCNT sets hierarchical levels of FIG. 8 to the hierarchy setting register LREG when a cache hit is generated in the cache memory C1B.

FIG. 8 shows an example of the hierarchical levels of each of the cache memories C0, C1A, C1B, and C2 when viewed from the processors P0-P3. In this example, the hierarchical levels of the cache memories C0, C1A, C1B, and C2 when viewed from the processor P0 are level 1, unused, level 2, and level 3, respectively. The hierarchical levels of the cache memories C0, C1A, C1B, and C2 when viewed from the processor P1 are unused, level 1, unused, unused, respectively. The hierarchical levels of the cache memories C0, C1A, C1B, and C2 when viewed from the processor P2 are unused, unused, unused, level 1, respectively. The hierarchical levels of the cache memories C0, C1A, C1B, and C2 when viewed from the processor P3 are unused, unused, unused, level 1, respectively. In the unused cache memory, a flag indicative of "unused" is set in the hierarchy setting register LREG.

FIG. 9 shows another example of the hierarchical levels of each of the cache memories C0, C1A, C1B, and C2 when viewed from the processors P0-P3. In this example, the hierarchical levels of the cache memories C0, C1A, C1B, and C2 when viewed from the processor P0 are level 1, unused, level 3, and level 2, respectively. The hierarchical levels of the cache memories C0, C1A, C1B, and C2 when viewed from the processor P1 are unused, level 1, unused, unused, respectively. The hierarchical levels of the cache memories C0, C1A, C1B, and C2 when viewed from the processor P2 are unused, unused, unused, level 1, respectively. The hierarchical levels of the cache memories C0, C1A, C1B, and C2 when viewed from the processor P3 are unused, unused, level 1, unused, respectively. However, when a cache miss was generated in the cache memory C1B, the processor P3 accesses the main memory MM without registering the cache line with the cache memory C1B. That is, only when a cache hit was generated in the cache memory C1B, the processor P3 uses the cache memory C1B.

FIG. 10 shows the transfer condition of a cache line at which the cache hit was generated in the cache memory of a lower hierarchy. The transfer condition shown in FIG. 10 is set in the transfer setting register TREG shown in FIG. 7. Since the cache memories C0, C1A will not be of a lower hierarchy, the transfer condition is not set. The cache memory C1B moves a cache line at which the cache hit was generated. The cache memory C2 copies a cache line at which the cache hit was generated.

Figures 11, 12:
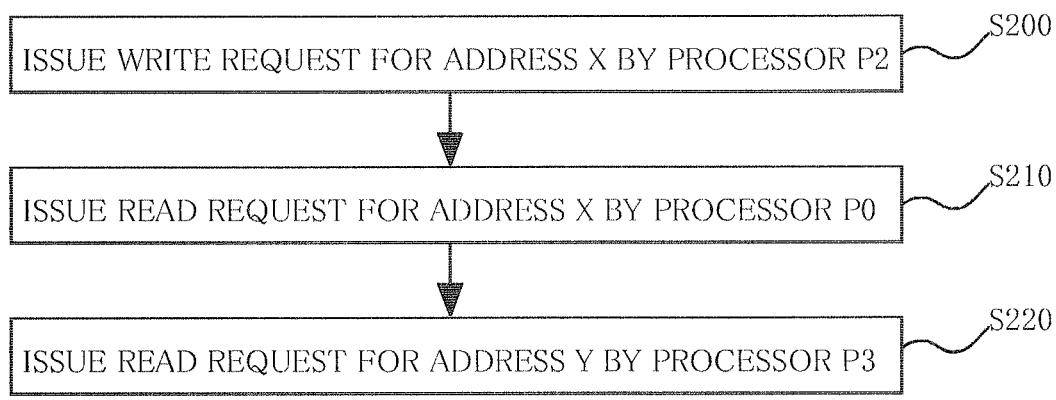
FIG. 11 illustrates a replacement condition of a cache line at the time of cache line registration, the replacement condition being set in a replacement setting register shown in FIG. 7.
FIG. 12 illustrates an example of the operation of a multiprocessor system of FIG. 7.

FIG. 11 shows the replacement condition of a cache line overflowed from a cache memory of a higher hierarchy when the cache line is registered. The condition shown in FIG. 11 is set in the replacement setting register RREG shown in FIG. 7. The replacement conditions of the cache memories C0, C1A, C1B, and C2 are "move", "discard", "write to main memory MM", and "discard", respectively. Here, "write to main memory MM" implies writing data back to the main memory MM.

FIG. 12 shows an example of the operation of the multi-processor system of FIG. 7. In this example, the data of the address X and the data of the address Y are not registered yet with the cache memories C0, C1A, C1B, and C2. Moreover, for the hierarchical levels of the cache memories C0, C1A, C1B, and C2 before operation S200, the hierarchical levels shown in FIG. 8 are set in the hierarchy setting register LREG shown in FIG. 7. As a method of driving out the existing data in order to secure a place for new data to be stored, the value of the LRU data used in a conventional cache memory system is used, though not shown in FIG. 7. The operation is described with such case as an example.

First, in operation S200, the processor P2 issues a write request for the address X to the cache memory C2 (level 1). The cache memory C2 results in a cache miss. The cache memory C2 notifies the access control unit ACNT of the cache miss. Since a cache memory having a lower hierarchy than the cache memory C2 is currently not set in the hierarchy setting register LREG, the access control unit ACNT issues a read request for a cache line including the address X to the main memory MM. The cache memory C2 registers a cache line read from the main memory MM, via the access control unit ACNT. The cache memory C2 writes to the registered cache line the data sent from the processor P2. Then, the cache memory C2 sets the written cache line to "dirty".

In operation S210, the processor P0 issues a read request for the address X to the cache memory C0 (level 1). The cache memory C0 results in a cache miss. The cache memory C0 notifies the access control unit ACNT of the cache miss. The access control unit ACNT issues a read request for the address X to the cache memory C1B (level 2). The cache memory C1B results in a cache miss. The cache memory C1B notifies the access control unit ACNT of the cache miss. The access control unit ACNT issues a read request for the address X to the cache memory C2 (level 3). The cache memory C2 results in a cache hit. The cache memory C2 notifies the access control unit ACNT of the cache hit. Since the transfer condition of the cache memory C2 of the transfer setting register TREG is currently set to "copy", the access control unit ACNT copies a cache line at which a cache hit was generated to the cache memory C0 of the uppermost hierarchy. The cache memory C0 checks the value of the LRU data to which a cache line sent from the cache memory C2 is to be assigned. The cache memory C0 drives out a cache line having the "oldest" value of the LRU data and registers the sent cache line. The cache memory C0 sets the value of the LRU data to the "latest". Then, the cache memory C0 returns the data of the address X to the processor P0. Since the replacement condition of the cache memory C0 of the replacement setting register RREG is currently set to "move", the access control unit ACNT moves a cache line (value of the LRU data is the "oldest") overflowed from the cache memory C0 to the cache memory C1B of one level lower. The cache memory C1B checks the value of the LRU data to which a cache line sent from the cache memory C0 is to be assigned. The cache memory C1B drives out a cache line having the "oldest" value of the LRU data and registers the sent cache line. Since the replacement condition of the cache memory C1B of the replacement setting register RREG is currently set to "write to main memory MM", the access control unit ACNT writes the data of the cache line to the main memory MM after confirming that the cache line overflowed from the cache memory C1B is "dirty". If it is not "dirty", the access control unit ACNT discards this without writing to the main memory MM. Moreover, the access control unit ACNT notifies the hierarchy setting unit LCNT of the fact that a cache hit was generated in the cache memory C2. The hierarchy setting unit LCNT changes the setting of the hierarchy setting register LREG from the hierarchical level of FIG. 8 to the hierarchical level of FIG. 9. Through this operation, for example, a certain application, once starting to use the data present in the cache memory C1B (or cache memory C2), will continue to access the data present in the cache memory C1B (or cache memory C2). In this case, if this application is operated by the processor P0, the hierarchy setting unit LCNT will change the hierarchical levels of the cache memories C1B, C2 in response to a cache hit in a lower hierarchy, and therefore the latency can be reduced.

In operation S220, the processor P3 issues a read request for the address Y to the cache memory C1B (level 1). The cache memory C1B results in a cache miss. The cache memory C1B notifies the access control unit ACNT of the cache miss. Since a cache memory having a lower hierarchy than the cache memory C1B is currently not set in the hierarchy setting register LREG, the access control unit ACNT issues a read request for the address Y to the main memory MM. The access control unit ACNT returns to the processor P3 the data read from the main memory MM without registering this read data with the cache memory C1B. For this reason, the data being present in the cache memory C1B and being required in the processor P0 is not driven out by the access of the processor P3. As a result, if the processor P0 accesses again the data currently registered with the cache memory C1B, the number of occurrence of cache miss in the cache memory C1B will decrease, and therefore the latency can be reduced. Moreover, when the processor P3 uses the data currently registered with the cache memory C1B, the processor P3 can access the cache memory C1B, and therefore the latency can be reduced further than in accessing the main memory MM.

As described above, also in this embodiment, the same effects as those of the embodiment described in FIG. 1 to FIG. 6 can be obtained. Furthermore, in this embodiment, the hierarchy setting unit LCNT changes the hierarchical levels of the cache memories C1B, C2 in response to a cache hit in a lower hierarchy, so that the latency can be reduced in continuously accessing the same cache memory.

Note that, in the embodiment described in FIG. 1 to FIG. 6, in operation S110 of FIG. 6, an example has been described in which the processor P1 having made an access request accesses the data while keeping the cache line at which a cache hit was generated in the cache memory C0 of a lower hierarchy. However, for example, the access control unit ACNT may cause the processor P1 to access the data present in the cache memory C0 without going through the cache memory C1. This eliminates the data delay time of the amount of going through the cache memory C1, so that the latency can be reduced.

In the embodiment described in FIG. 1 to FIG. 6, an example has been described in which the value of the LRU data is used as the transfer condition of a cache line at which a cache hit was generated. However, the hardware configuration can be simplified, for example, by employing a method of determining the transfer condition without using the value of the LRU data. Also in this case, such transfer condition that the latency becomes optimal for each application can be set, so that the latency can be reduced. Moreover, a method may be employed wherein the transfer condition is determined using another access information, in place of the LRU data, as the access information which is a record of being accessed from the processor to a cache line. For example, the number of accesses of a cache line at which a cache hit was generated is recorded in each of the tags TG0-TG3 of each of the cache memories C0-C3, and the number of accesses recorded in each of the tags TG0-TG3 is used as the transfer condition. That is, the access control unit ACNT operates in accordance with the information stored in the tags TGO-TG3 in addition to the conditions set in the transfer setting register TREG. Also in this case, such transfer condition that the latency becomes optimal for each application can be set, so that the latency can be reduced.

In the embodiment described in FIG. 1 to FIG. 6, an example of controlling a cache line overflowed from a cache memory of a higher hierarchy has been described. However, the number of registers can be reduced, for example, by employing a method of setting the control of a cache line overflowed from a higher hierarchy only to "move" and moving the cache line to other cache memories without using the replacement setting register RREG. Also in this case, the access control unit ACNT moves a cache line overflowed from a higher hierarchy to other cache memories, so that the chances to access the main memory MM can be reduced and the latency can be reduced.

A proposition of the embodiments is to reduce the latency while maintaining a high efficiency of cache memory utilization.

In the embodiments described above, the multiprocessor system includes a cache memory corresponding to each processor, a hierarchy setting register in which the hierarchical level of each cache memory is set, and an access control unit that controls access between each cache memory.

Each processor handles a cache memory corresponding to another processor as the cache memory having a deeper hierarchy than a cache memory corresponding to the each processor. As the result, each processor can access all the cache memories, so that the efficiency of cache memory utilization can be improved. Since the hierarchical level of a cache memory for each processor is stored in a rewritable hierarchy setting register, it can be changed so that the latency may be optimal for each application.

Moreover, the condition (hereinafter, referred to also as the transfer condition) for determining whether to move, copy, or keep a cache line when a cache hit was generated in the cache memory of a lower hierarchy is set in a rewritable transfer setting register. This allows for setting of such transfer condition that the latency becomes optimal for each application. For example, a certain application continues to use a cache line currently registered with the cache memory of a lower hierarchy. In this case, the latency can be reduced by setting the transfer condition of the cache line to "move" or "copy". In another example, a specific processor more frequently accesses the data shared by each of the processors than the other processors. In this case, the latency can be reduced by setting the transfer condition of a cache memory corresponding to the specific processor to "keep".

As the result, the latency can be reduced while maintaining a high efficiency of cache memory utilization.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A multiprocessor system, comprising:
   a plurality of processors;
   a plurality of cache memories having a hierarchical level for each processor and being shared by the processors;
   a rewritable hierarchy setting register storing the hierarchical level of the cache memory for each processor, the hierarchical level indicating an order for accessing the plurality of cache memories viewed from each processor when a data transfer is executed between the processors and the cache memories; and
   an access control unit controlling access between each cache memory in accordance with the hierarchical level set in the hierarchy setting register, wherein
   the order for accessing the plurality of cache memories in response to an access request from the each processor is changed by rewriting the hierarchical level of the cache memory stored in the hierarchy setting register.

2. The multiprocessor system according to claim 1, further comprising
   a setting unit rewriting the hierarchical level of the cache memory stored in the hierarchy setting register when the access request generated a cache miss in a cache memory of a higher hierarchy and generated a cache hit in a cache memory of a lower hierarchy.

3. A multiprocessor system comprising:
   a plurality of processors;
   a plurality of cache memories having a different hierarchical level for each processor and being shared by the processors;
   a rewritable hierarchy setting register storing a hierarchical level of the cache memory;
   an access control unit controlling access between each cache memory in accordance with the hierarchical level set in the hierarchy setting register; and
   a rewritable transfer setting register, in which a condition is set for determining, whether to move a cache line at which a cache hit was generated in the cache memory of a lower hierarchy to the cache memory of a higher hierarchy, copy a cache line at which the cache hit was generated in the cache memory of the lower hierarchy to the cache memory of the higher hierarchy, or keep a cache line at which the cache hit was generated in the cache memory of the lower hierarchy when an access request from the each processor to the cache memory generated a cache miss in the cache memory of the higher hierarchy and generated the cache hit in the cache memory of the lower hierarchy, wherein the access control unit operates in accordance with the condition set in the transfer setting register.

4. The multiprocessor system according to claim 3, further comprising a tag storing a record of being accessed from the processor to the cache line of the cache memory, wherein the access control unit operates in accordance with information stored in the tag in addition to the condition set in the transfer setting register.

5. The multiprocessor system according to claim 4, wherein the tag stores Least Recently Used data which is data for selecting a cache line having the longest unused time.

6. The multiprocessor system according to claim 3, wherein the access control unit, moves a cache line, having overflowed from the cache memory of the higher hierarchy, to another cache memory when having moved the cache line at which the cache hit was generated in the cache memory of the lower hierarchy to the cache memory in which the cache miss was generated in the higher hierarchy.

7. The multiprocessor system according to claim 3, further comprising:

a main memory shared by the processors; and a rewritable replacement setting register, in which a condition is set for determining, whether to move a cache line, having overflowed from the cache memory of the higher hierarchy to another cache memory, to write the same to the main memory, or to discard the same when having moved the cache line at which the cache hit was generated in the cache memory of the lower hierarchy to the cache memory in which the cache miss was generated in the higher hierarchy, wherein the access control unit operates in accordance with the condition set in the replacement setting register.

8. The multiprocessor system according to claim 3, wherein when a condition of "keep" is currently set in the transfer setting register, the access control unit, keeps the cache line at which the cache hit was generated and directly accesses the cache memory of the lower hierarchy in which the cache hit was generated when an access request from the each processor to the cache memory generated a cache miss in a cache memory of a higher hierarchy and generated a cache hit in a cache memory of a lower hierarchy.

9. The multiprocessor system according to claim 3, further comprising a setting unit rewriting the hierarchical level of the cache memory stored in the hierarchy setting register when the access request generated the cache miss in the cache memory of the higher hierarchy and generated the cache hit in the cache memory of the lower hierarchy.

10. A method of operating a multiprocessor system comprising a plurality of processors, and a plurality of cache memories shared by the processors, the method comprising the operations of:

setting a hierarchical level of the cache memory for each of the processors, the hierarchical level for each processor being rewritable, the hierarchical level indicating an order for accessing the plurality of cache memories viewed from each processor when a data transfer is executed between the processors and the cache memories:

controlling access between each cache memory in accordance with the hierarchical level of the cache memory; and the order for accessing the plurality of cache memories in response to an access request from the each processor is changed by rewriting the hierarchical level of the cache memory stored in a hierarchy setting register.

11. The method of operating a multiprocessor system according to claim 10, the method wherein the operation of rewriting the hierarchical level when the access request generated a cache miss in a cache memory of a higher hierarchy and generated a cache hit in a cache memory of a lower hierarchy.

12. A method of operating a multiprocessor system comprising a plurality of processors, and a plurality of cache memories shared by the processors, the method comprising the operations of setting the cache memory to a different hierarchical level for each of the processors, the hierarchical level being rewritable; and controlling access between each cache memory in accordance with the hierarchical level of the cache memory;

setting a transfer condition, which is a condition for determining, whether to move a cache line at which a cache hit was generated in the cache memory of a lower hierarchy to the cache memory of a higher hierarchy, copy a cache line at which the cache hit was generated in the cache memory of the lower hierarchy to the cache memory of the higher hierarchy, or keep a cache line at which the cache hit was generated in the cache memory of the lower hierarchy when an access request from the each processor to the cache memory generated a cache miss in the cache memory of the higher hierarchy and generated the cache hit in the cache memory of the lower hierarchy, the transfer condition being rewritable; and controlling the cache line in accordance with the transfer condition.

13. The method of operating a multiprocessor system according to claim 12, the method further comprising the operations of:

storing access information, which is a record accessed from the processor to a cache line of the cache memory; and controlling the cache line in accordance with the access information in addition to the transfer condition.

14. The method of operating a multiprocessor system according to claim 13, the method further comprising the operation of using, as the access information, Least Recently Used data which is data for selecting a cache line having the longest unused time.

15. The method of operating a multiprocessor system according to claim 12, the method further comprising the operation of moving a cache line, having overflowed from the cache memory of the higher hierarchy, to another cache memory, when having moved a cache line at which the cache hit was generated in the cache memory of the lower hierarchy to the cache memory in which the cache miss was generated in the higher hierarchy.

16. The method of operating a multiprocessor system according to claim 12, wherein the processors share a main memory, and wherein the method further comprising the operations of:

setting a replacement condition which is a condition for determining, whether to move a cache line, having overflowed from the cache memory of the higher hierarchy to another cache memory, to write the same to the main memory, or to discard the same when having moved a cache line at which the cache hit was generated in the cache memory of the lower hierarchy to the cache memory in which the cache miss was generated in the higher hierarchy, the replacement condition being rewritable; and controlling the cache line, which overflowed from the cache memory of the higher hierarchy, in accordance with the replacement condition.

17. The method of operating a multiprocessor system according to claim 12, the method further comprising the operation of:

when the transfer condition is a condition of "keep", keeping the cache line at which the cache hit was generated and directly accessing the cache memory of the lower hierarchy in which the cache hit was generated when an access request from the each processor to the cache memory generated a cache miss in a cache memory of a higher hierarchy and generated a cache hit in a cache memory of a lower hierarchy.

18. The method of operating a multiprocessor system according to claim 12, the method further comprising the operation of rewriting the hierarchical level when the access request generated the cache miss in the cache memory of the higher hierarchy and generated the cache hit in the cache memory of the lower hierarchy.

* * * * *